US009399715B2

(12) United States Patent
Stockl et al.

(10) Patent No.: US 9,399,715 B2
(45) Date of Patent: *Jul. 26, 2016

(54) LOW VOC ADDITIVES FOR EXTENDING THE WET EDGE AND OPEN TIME OF AQUEOUS COATINGS

(75) Inventors: Rebecca Reid Stockl, Kingsport, TN (US); Kevin Wayne McCreight, Kingsport, TN (US); Thauming Kuo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,581

(22) Filed: May 19, 2011

(65) Prior Publication Data

US 2011/0218285 A1   Sep. 8, 2011

Related U.S. Application Data

(60) Division of application No. 12/552,802, filed on Sep. 2, 2009, now Pat. No. 8,444,758, which is a continuation-in-part of application No. 11/583,570, filed on Oct. 19, 2006, now abandoned.

(60) Provisional application No. 61/094,576, filed on Sep. 5, 2008.

(51) Int. Cl.
| | |
|---|---|
| *C09D 4/02* | (2006.01) |
| *C08K 5/11* | (2006.01) |
| *C09D 7/00* | (2006.01) |
| *C08L 93/04* | (2006.01) |
| *C09D 5/02* | (2006.01) |
| *C09D 7/06* | (2006.01) |
| *C09D 7/12* | (2006.01) |
| *C09D 125/14* | (2006.01) |
| *C09D 193/04* | (2006.01) |
| *C08K 5/00* | (2006.01) |
| *C08K 5/053* | (2006.01) |
| *C08K 5/103* | (2006.01) |
| *C08L 33/06* | (2006.01) |
| *C08L 41/00* | (2006.01) |

(52) U.S. Cl.
CPC ............... *C09D 7/001* (2013.01); *C08L 93/04* (2013.01); *C09D 5/024* (2013.01); *C09D 7/06* (2013.01); *C09D 7/125* (2013.01); *C09D 125/14* (2013.01); *C09D 193/04* (2013.01); *C08K 5/0016* (2013.01); *C08K 5/053* (2013.01); *C08K 5/103* (2013.01); *C08L 33/06* (2013.01); *C08L 41/00* (2013.01)

(58) Field of Classification Search
CPC ........ C09D 5/024; C09D 7/001; C09D 93/04; C08L 93/04; C08L 33/06; C08L 41/00
USPC ................................................ 106/218, 241
See application file for complete search history.

(56) References Cited

U.S. PATENT DOCUMENTS

| | | | |
|---|---|---|---|
| 3,734,874 A | 5/1973 | Kibler et al. | |
| 3,779,993 A | 12/1973 | Kibler et al. | |
| 4,139,514 A | 2/1979 | Bassett | |
| 4,335,220 A | 6/1982 | Coney | |
| 4,647,610 A | 3/1987 | Sperry et al. | |
| 5,334,679 A * | 8/1994 | Yamamoto et al. | ........... 526/200 |
| 5,349,026 A | 9/1994 | Emmons et al. | |
| 5,371,148 A | 12/1994 | Taylor et al. | |
| 5,541,268 A | 7/1996 | Fenn et al. | |
| 5,863,847 A | 1/1999 | De Voe et al. | |
| 5,962,579 A * | 10/1999 | Schulz et al. | ................. 524/522 |
| 6,262,149 B1 | 7/2001 | Clark et al. | |
| 6,423,856 B1 * | 7/2002 | Springer et al. | ............... 554/173 |
| 6,432,601 B1 | 8/2002 | Foucher et al. | |
| 6,476,121 B1 | 11/2002 | Kadambande et al. | |
| 6,875,842 B2 | 4/2005 | Fontana | |
| 8,444,758 B2 | 5/2013 | Stockl et al. | |
| 2002/0016406 A1 | 2/2002 | Chen et al. | |
| 2003/0232920 A1 | 12/2003 | Chung et al. | |
| 2004/0127681 A1 | 7/2004 | Kutsek | |
| 2004/0259989 A1* | 12/2004 | O'Brien et al. | ............... 524/236 |
| 2005/0136278 A1 | 6/2005 | Hutter et al. | |
| 2006/0229222 A1 | 10/2006 | Muller et al. | |
| 2007/0092569 A1 | 4/2007 | Kshirsagar et al. | |
| 2007/0148357 A1 | 6/2007 | Joecken et al. | |
| 2008/0182929 A1 | 7/2008 | Strepka et al. | |

FOREIGN PATENT DOCUMENTS

| | | |
|---|---|---|
| EP | 0 210 747 | 2/1987 |
| EP | 0 317 906 | 5/1989 |
| EP | 0359129 A2 | 3/1990 |
| GB | 2 266 533 | 11/1993 |
| JP | 07-144361 | 6/1995 |
| JP | 2007-238729 | 9/2007 |
| WO | WO 98/27162 | 6/1998 |
| WO | WO 99/10413 | 3/1999 |
| WO | WO 2008/054277 A1 | 5/2008 |

OTHER PUBLICATIONS

Machine translation of Takahashi et al (JP07-144361).*
Copending U.S. Appl. No. 11/583,570, filed Oct. 19, 2006.

(Continued)

*Primary Examiner* — Jun Li
(74) *Attorney, Agent, or Firm* — Dennis V. Carmen

(57) ABSTRACT

Disclosed is a low VOC coating additive employing a water-dispersible polymer, a water insoluble plasticizer, cyclohexanedimethanol, and optionally an amphiphilic component. The additive can be added to a coating to improve at least one performance characteristics of the coating, such as, wet-edge time, open time, scrub resistance, wet adhesion, and water resistance.

34 Claims, No Drawings

(56) References Cited

OTHER PUBLICATIONS

Copending U.S. Appl. No. 12/552,802, filed Sep. 2, 2009.
PCT International Search Report and Written Opinion for PCT/US2007/021555 dated Jan. 30, 2008.
PCT International Search Report and Written Opinion for PCT/US2009/004996 dated Dec. 1, 2009.
Office Action dated Mar. 19, 2009 in copending U.S. Appl. No. 11/583,570.
Office Action dated Oct. 6, 2009 in copending U.S. Appl. No. 11/583,570.
Office Action dated Apr. 7, 2011 in copending U.S. Appl. No. 11/583,570.
Office Action dated Apr. 7, 2011 in copending U.S. Appl. No. 12/552,802.
USPTO Office Action dated Oct. 21, 2011 for co-pending U.S. Appl. No. 11/583,570.
USPTO Office Action dated Nov. 17, 2011 for co-pending U.S. Appl. No. 12/552,802.
USPTO Office Action dated Nov. 5, 2012 for co-pending U.S. Appl. No. 11/583,570.
USPTO Office Action dated Nov. 9, 2012 for co-pending U.S. Appl. No. 12/552,802.

\* cited by examiner

LOW VOC ADDITIVES FOR EXTENDING THE WET EDGE AND OPEN TIME OF AQUEOUS COATINGS

CROSS REFERENCE TO RELATED APPLICATIONS

This application is a divisional application which claims priority to U.S. Non-Provisional application Ser. No. 12/552,802, filed Sep. 2, 2009, which is a continuation in part application which claims priority to U.S. Non-Provisional application Ser. No. 11/583,570, filed Oct. 19, 2006; it also claims priority to U.S. Provisional Application 61/094,576 filed Sep. 5, 2008, the disclosures of which are herein incorporated by reference in their entirety to the extent they do not contradict the statements herein.

FIELD OF THE INVENTION

The present invention relates generally to the use of low volatile organic compound (VOC) additives in coatings. In another aspect, the invention relates to coating additives having less than about 20 weight percent VOCs comprising a water-dispersible polymer having a glass transition temperature (Tg) of at least about 20° C. and a water-insoluble plasticizer having a molecular weight of less than 1000 g/mole, where the additives are operable to improve the drying characteristics of a coating.

DESCRIPTION OF THE PRIOR ART

In general, a need exists when applying a decorative or protective coating to a substrate to be able to repair irregularities in the still-wet coating after a period of time has elapsed. For example, such repair can be achieved by re-brushing over a previously coated substrate, either over the main area of the coating or on the edge of the coating. In addition, it is desirable for a coating to exhibit relatively short tack-free times when applied to a substrate. For many years, solvent-based coatings have typically been employed for most conceivable applications. In solvent based coatings, organic solvents are employed to modify the drying characteristics of the coating composition to achieve the above-mentioned needs. For example, organic solvent-based alkyds having an open time of between 30 and 45 minutes are readily available. However, solvent-based coatings tend to have a relatively high VOC content. Thus, due to increased restrictions on VOCs in coatings, many in the industry have begun employing aqueous coatings for a variety of applications.

Aqueous coatings, however, typically provide less than adequate open and wet edge time to repair irregularities in a still-wet coating after being applied to a substrate, in addition to increased tack-free times. Aqueous coatings generally employ dispersed high molecular weight polymers as the binder material in the coating. The use of such polymers results in short wet edge times when the coating composition is dried because the dispersed polymer particles tend to coalesce in the edge region of an applied coating relatively soon after the coating has been applied. As a continuous film is formed, the viscosity of the coating increases rapidly, due to the high molecular weight of the polymers comprising the coatings, which leads to limited wet edge and open times.

In order to alleviate these shortcomings, additives are typically combined with the aqueous coating to improve the drying characteristics. It is a common practice in the industry to incorporate small molecule alkylene glycols, such as ethylene or propylene glycol, to achieve longer wet edge or open time. However, the addition of these small molecule glycols contributes to the overall VOC content of the coating composition. As regulations restrict the allowable amount of VOC content in coatings, the amount of alkylene glycols must often be reduced, which leads to reduced wet edge and open times. Accordingly, there is a need for additives that can prolong wet edge and open times without contributing significantly to the VOC content of the coating and without compromising other coating performance properties.

SUMMARY OF THE INVENTION

In one embodiment of the present invention, there is provided an additive for enhancing the performance of a coating. The additive comprises: (a) a water-dispersible polymer having a glass transition temperature (Tg) in the range of from about 20° C. to about 160° C., (b) a water-insoluble plasticizer having a molecular weight of less than about 1,000 g/mole, and (c) cyclohexanedimethanol. Also, the additive has a volatile organic compound (VOC) content of less than about 20 weight percent.

In another embodiment of the present invention, there is provided a coating comprising: water; a binder; and an additive. The additive comprises (a) a water-dispersible polymer having a glass transition temperature (Tg) in the range of from about 20° C. to about 160° C., (b) a water-insoluble plasticizer having a molecular weight of less than about 1000 g/mole, and (c) cyclohexanedimethanol. Also, the additive has a VOC content of less than about 20 weight percent.

In a further embodiment of the present invention, there is provided a coating comprising: water; a binder; and the additive, wherein the additive has a VOC content of less than about 20 weight percent. Also, in other embodiments of the invention, the coating can have at least one of the following properties: a wet edge time of at least about 1.5 minutes, an open time of at least about 1.5 minutes, a scrub resistance of at least about 500 cycles, a wet adhesion of at least about 3, and a water resistance of at least about 3.

In yet another embodiment of the present invention, there is provided a method of making a coating additive. The method comprises: (a) combining a water-dispersible polymer having a Tg in the range of from about 20 to about 160° C., a water-insoluble plasticizer having a molecular weight of less than about 1000 g/mole, and cyclohexanedimethanol; and (b) neutralizing and dispersing the mixture at an elevated temperature to obtain an aqueous dispersion. The resulting dispersion has a VOC content of less than about 20 weight percent.

DETAILED DESCRIPTION

In accordance with one embodiment of the present invention, a low volatile organic compound (VOC) content additive is provided that generally comprises a water-dispersible polymer and a water-insoluble plasticizer. The additive can be employed in a coating so as to improve the coating's properties, such as, for example, open time, wet edge time, block resistance, gloss, and scrub resistance, when being applied to a substrate and upon drying.

The water-dispersible polymer can be any polymer that readily forms an aqueous dispersion upon addition to water. In one embodiment, the water-dispersible polymer can have a glass transition temperature (Tg) of at least about 20° C.

In one embodiment of the present invention, the additive can comprise at least about 20 weight percent of the water-dispersible polymer based on the total weight of the solids in the additive. Additionally, the additive can comprise water-dispersible polymer in the range of from about 30 to about 70 weight percent, in the range of from about 40 to about 60 weight percent, or in the range of from 45 to 55 weight percent based on the total weight of the solids in the additive.

In one embodiment of the present invention, the water-dispersible polymer can be a vinyl polymer that has been subjected to neutralization with a base. Prior to neutralization, the vinyl polymer can be formed of polymerized ethylenically unsaturated monomers, at least one of which can comprise a carboxylic acid end group and/or an anhydride end group, such that the vinyl polymer can comprise monomer residues having at least one carboxylic acid end group and/or at least one anhydride end group. Suitable carboxylic acid and/or anhydride containing monomers include, but are not limited to, acrylic acid, methacrylic acid, itaconic acid, crotonic acid, and maleic anhydride.

In one embodiment of the present invention, the vinyl polymer, prior to neutralization, can be a copolymer, formed of the above mentioned polymerized carboxylic acid and/or anhydride containing monomers, and one or more ethylenically unsaturated monomers. Such ethylenically unsaturated monomers include, but are not limited to, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethylolpropyl triacrylate, styrene, α-methyl styrene, vinyl naphthalene, vinyl toluene, chloromethyl styrene, glycidyl methacrylate, carbodiimide methacrylate, $C_1$-$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, iso-propenyl(meth)acrylate, cycloaliphaticepoxy(meth)acrylates, ethylformamide, 4-vinyl-1,3-dioxolan-2-one, 2,2-dimethy-1,4-vinyl-1,3-dioxolane, 3,4-di-acetoxy-1-butene, monovinyl adipate, t-butylaminoethyl methacrylate, dimethylaminoethyl methacrylate, diethylamino ethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamido-ethylethylene urea. Further monomers are described in *The Brandon Associates*, 2nd edition, 1992 Merrimack, N. H., and in *Polymers and Monomers*, the 1996-1997 Catalog from Polyscience, Inc., Warrington, Pa.

The vinyl polymer can be prepared by any method known in the art for chain polymerization. Such polymerization techniques include, but are not limited to, bulk polymerization, solution polymerization or emulsion polymerization. In one embodiment, the general technique described in U.S. Pat. No. 6,262,149, incorporated herein by reference, for emulsion polymerization may be employed to form the vinyl polymer.

In one embodiment, the vinyl polymer, prior to neutralization can have an acid number of at least about 80 mg KOH/g, in the range of from about 100 to about 500 mg KOH/g, in the range of from about 150 to about 300 mg KOH/g, or in the range of from 180 to 250 mg KOH/g. Furthermore, the vinyl polymer can have a Tg of at least about 40° C., or in the range of from about 60 to about 130° C., or in the range of from 70 to 110° C.

Suitable examples of commercially available vinyl polymers include, but are not limited to, JONCRYL 67, JONCRYL 678, JONCRYL ECO 694 (all available from BASF), Neocryl BT-100 or BT-175 (available from DSM Neoresins), MOREZ 101 (available from Rohm and Haas), CARBOSET GA-1166, GA-2299, or GA-2300 (available from Noveon), EASTACRYL Emulsion 30D (available from Eastman Chemical Co.), Secryl 35 (available from Omnova Solutions) and VANCRYL 65 or 68 (available from Cytec Surface Specialties).

As mentioned above, the vinyl polymer of the present invention can be neutralized with a base to form a water-dispersible vinyl polymer. The bases that can be used in the present invention to neutralize the vinyl polymer can be divided into two classes. The first class of bases can comprise an alkali metal base or alkaline earth metal base, which in aqueous solution can neutralize the carboxylic acid and/or anhydride end groups on the vinyl polymer. Such basic compositions include bases derived from alkali metals and alkaline earth metals such as, for example, sodium, potassium, magnesium, calcium, and other basic metal compounds. Suitable bases from this first class of bases useful in the present invention include, but are not limited to, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate. Neutralization of the vinyl polymer with this first class of bases can form a metal salt of the vinyl polymer.

The second class of bases can comprise volatile nitrogen bases. Such bases can include basically reacting compounds that can be volatilized through the action of heat or upon exposure to ambient atmosphere, and can include nitrogen compounds. Suitable bases from this second class of bases useful in the present invention include, but are not limited to, ammonia, ammonium hydroxide, methylamine, dimethylamine, trimethylamine, ethylamine, diethylamine, triethylamine, ethanolamine, dimethylethanolamine, diethanolamine, triethanolamine, and morpholine. Neutralization of the vinyl polymer with this second class of bases can form, for example, an ammonium salt of the vinyl polymer.

In another embodiment of the present invention, the water-dispersible polymer can be a sulfopolymer. The sulfopolymer can be any polymer comprising at least one monomer residue having a sulfonate moiety. In one embodiment, the sulfopolymer can comprise a sulfopolyester, a sulfopolyamide, or a sulfopolyesteramide. In another embodiment of the present invention, the sulfopolymer can comprise the residues of one or more of a glycol monomer, a dicarboxylic acid monomer, a diamine monomer, and/or a sulfomonomer.

In one embodiment, the sulfopolymer can be formed of one or more glycol monomers such as, for example, aliphatic, alicyclic, and/or aralkyl glycols. Examples of such glycol monomers include, but are not limited to, diethylene glycol, ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol. Furthermore, the sulfopolymer may be a copolymer prepared from two or more of the above glycols.

The sulfopolymer can be formed of one or more dicarboxylic acid monomers such as, for example, aliphatic dicarboxylic acids, alicyclic dicarboxylic acids, and/or aromatic dicarboxylic acids. Examples of such dicarboxylic acid monomers include, but are not limited to, succinic acid, glutaric acid, adipic acid, azelaic acid, sebacic acid, fumaric acid, maleic acid, itaconic acid, 1,4-cyclohexanedicarboxylic acid, phthalic acid, terephthalic acid, and isophthalic acid.

The sulfopolymer can be formed of one or more diamine monomers. Examples of such diamine monomers include, but are not limited to, ethylenediamine, hexamethylenediamine, 2,2,4-trimethylhexamethylenediamine, 4-oxaheptane-1,7-diamine, 4,7-dioxadecane-1,10-diamine, 1,4-cyclohexanebismethylamine, 1,3-cyclohexanebismethylamine, heptamethylenediamine, and/or dodecamethylenediamine.

In one embodiment, the sulfopolymer can comprise the residue of a sulfomonomer. The sulfomonomer can be a difunctional component, wherein a metal sulfonate group is attached to an aromatic acid nucleus such as benzene, naphthalene, diphenyl, oxydiphenyl, sulfonyldiphenyl or methylenediphenyl nucleus. Examples of such difunctional sulfomonomers include, but are not limited to, sulfophthalic acid, sulfoterephthalic acid, sulfoisophthalic acid, 4-sulfonaphthalene-2,7-dicarboxylic acid, esters of 4-sulfonaphthalene-2,7-dicarboxylic acid, and/or metallosulfoaryl sulfonate. Furthermore, the difunctional sulfomonomer can be a dicarboxylic acid or an ester thereof containing a metal sulfonate group, a glycol containing a metal sulfonate group, or a hydroxy acid containing a metal sulfonate group. The metal ion of the metal sulfonate group may be $Na^+$, $K^+$, $Li^+$, and the like. Additionally, the difunctional sulfomonomer can comprise 5-sodiosulfoisophathalic acid.

Additional monomers and polymerization techniques that can be used to form the sulfopolymer are described in U.S. Pat. Nos. 3,734,874, 3,779,993, and 4,335,220, which are herein incorporated by reference.

In one embodiment of the present invention, the sulfopolymer can be a linear polymer having a number average molecular weight of at least about 5,000. Additionally, the sulfopolymer can have a Tg of at least about 25° C. Furthermore, the sulfopolymer can have a Tg in the range of from about 30 to about 60° C., or in the range of from 35 to 55° C.

Suitable examples of commercially available sulfopolymers include, but are not limited to, EASTMAN AQ-29, AQ-38, AQ-48, and AQ 55 polymers, all available from Eastman Chemical Company.

The water insoluble plasticizer used in the present invention in principle can be any hydrophobic compounds that have a molecular weight of less than 1000 g/mole and have limited solubility in water. A plasticizer is a compound that is capable of increasing the free volume of a polymer by embedding itself between polymer chains, and thus, lowering the glass transition temperature of the polymer. The plasticizer used in this invention may be either a solid or a liquid. In one embodiment of the invention, the suitable plasticizers for this invention can have a boiling point of greater than about 250° C., or greater than 300° C., since the additive of the present invention exhibits a low VOC content. In another embodiment of the invention, the solubility of the plasticizers in water is less than about 10 weight % at 20° C., or less than about 5 weight % at 20° C.

One class of the plasticizers suitable for this invention is represented by the compounds selected from the esters of a glycol, a triol, and/or a polyol. Examples of such plasticizers include, but are not limited to, tri(ethylene glycol) bis(2-ethylhexanoate), tri(ethylene glycol) bis(n-octanoate), tetra(ethylene glycol) bis(2-ethylhexanoate), tetra(ethylene glycol) dihexanoate, or other tri(ethylene glycol)-, tetra(ethylene glycol)-, di(ethylene glycol)-, and ethylene glycol-based $C_3$-$C_{18}$ alkyl diesters or monoesters; di(propylene glycol) bis(2-ethylhexanoate), tri(propylene glycol) bis(2-ethylhexanoate), tri(propylene glycol) dihexanoate, or other tri(propylene glycol)-, tetra(propylene glycol)-, di(propylene glycol)- and propylene glycol based $C_3$-$C_{18}$ alkyl diesters or monoesters including those esters with fatty acids such as lauric acid, soya acid, sunflower oil fatty acid, corn oil fatty acid, coconut oil fatty acid, palmitic acid, myristic acid, tetradecanoic acid, and the like; 2,2,4-trimethyl-1,3-pentanediol monoisobutyrate; 2,2,4-trimethyl-1,3-pentanediol diisobutyrate; glycerol triacetate, glycerol tributyrate, glycerol trihexanoate, glycerol tri(2-ethylhexanoate), glycerol dibutyrate, glycerol diisobutyrate, glycerol di(2-ethylhexanoate), trimethylolpropane triacetate, and the like; dipropylene glycol dibenzoate, diethylene glycol dibenzoate, 1,4-cyclohexane dimethanol dibenzoate, propylene glycol dibenzoate, tripropylene glycol dibenzoate, glycerol tribenzoate, pentaerythritol tetrabenzoate, and other aromatic esters of a glycol, a triol, or a polyol; benzyl phthalate ester of 2,2,4-trimethyl-1,3-pentanediol monoisobutyrate; and esters of a monosaccharide or disaccharide, such as sucrose acetate isobutyrate (SAIB).

The plasticizers suitable for this invention may also be a monoester of a monofunctional aromatic carboxylic acid and a monofunctional alcohol. Examples of such benzoates include, but are not limited to, 2-ethylhexyl benzoate, isodecyl benzoate, n-octyl benzoate, other benzoates of $C_6$-$C_{18}$ fatty alcohols, and the like.

Another class of the plasticizers suitable for this invention is represented by the compounds selected from the esters of a dicarboxylic acid and/or a tricarboxylic acid. Examples of such plasticizers include diisononyl cyclohexane-1,2-dicarboxylate, bis(2-ethylhexyl) phthalate, diisononyl phthalate, dinonyl phthalate, diisooctyl phthalate dibutyl phthalate, dimethyl phthalate, diethyl phthalate, diundecyl phthalate, butyl benzyl phthalate or other benzyl phthalate esters of $C_4$-$C_9$ alcohols, diisodecyl phthalate, di-n-octyl phthalate, diethyl terephthalate, dibutyl terephthalate, dioctyl terephthalate, or other bis($C_3$-$C_{18}$-alkyl) phthalates or terephthalates; trimethyl trimellitate, triisononyl trimellitate, tri(2-ethylhexyl) trimelliate, tri(n-octyl, n-decyl) trimelliate, tri-(heptyl, nonyl) trimelliate, n-octyl trimelliate, and the like; aliphatic plasticizers also include ditridecyl adipate, diisodecyl adipate, diisononyl adipate, bis(2-ethylhexyl) adipate, dioctyl adipate, dibutyl sebacate, dibutyl maleate, diisobutyl maleate, and the like; dioctyl azelate, triethyl citrate, acetyl triethyl citrate, tributyl citrate, acetyl tributyl citrate, trioctyl citrate, acetyl trioctyl citrate, thrihexyl citrate, butyryl trihexyl citrate, and the like.

Another class of the plasticizers suitable for this invention is represented by the compounds selected from the esters of benzoic acid with alcohols, diols, triols, or polyols. Since it is desirable for the plasticizers to be of limited water solubility in this invention, esters having a hydrophobic moiety are particularly preferred. Examples of such plasticizers are 2-ethylhexyl benzoate, dipropylene glycol dibenzoate, diethylene glycol dibenzoate, 1,4-cyclohexane dimethanol dibenzoate, isodecyl benzoate, propylene glycol dibenzoate, tripropylene glycol dibenzoate, glycerol tribenzoate, pentaerythritol tetrabenzoate, the benzyl phthalate ester of 2,2,4-trimethyl-1,3-pentanediol monoisobutyrate, the benzyl phthalate ester of $C_7$-$C_9$ linear alcohols (Santicizer® 261) and other aliphatic and aromatic monoesters, diesters, and triesters of benzoic acid and the like. This class of plasticizers also includes those of fatty acid esters and diesters of alcohols, diols, and triols. Examples include methyl laurate, methyl soyate, methyl myristate, and the like; the propylene glycol monoester or diester with sunflower fatty acid, the propylene glycol monoester with corn oil fatty acid, the propylene glycol monoester or diester with linoleic acid, the propylene glycol monoester or diester with palmitic acid, the propylene glycol monoester or diester with hexadecenoic acid, the propylene glycol monoester or diester with myristic acid, the propylene glycol monoester or diester with tetradecanoic acid, and other monoester, diester, and triesters of $C_3$-$C_{18}$ alkyl acids.

An additional class of the plasticizers suitable for this invention is represented by the compounds selected from the ethers of a glycol, a triol, and/or a polyol. Since it is desirable for the plasticizers to be water insoluble in this invention, ethers having a hydrophobic moiety are particularly preferred. Examples of such plasticizers include ethylene glycol mono(2-ethylhexyl ether), ethylene glycol bis(2-ethylhexyl ether), propylene glycol mono(2-ethylhexyl ether), propylene glycol bis(2-ethylhexyl ether), propylene glycol dibutyl ether, propylene glycol phenyl ether, ethylene glycol monohexyl ether, ethylene glycol dihexyl ether, ethylene glycol phenyl ether, dipropylene glycol butyl ether, dipropylene glycol propyl ether, dipropylene glycol phenyl ether, diethylene glycol mono(2-ethylhexyl ether), diethylene glycol monobutyl ether, tripropylene glycol butyl ether, glycerol triacetate, ethylene glycol monobutyl ether acetate, ethylene glycol monohexyl ether acetate, diethylene glycol monobutyl ether acetate, and the like.

Other plasticizers may be used for this invention include, but are not limited to, tributyl phosphate, tricresyl phosphate, triphenyl phosphate, tert-butylphenyl diphenyl phosphate, trixylyl phosphate, isodecyl diphenyl phosphate, tributyl phosphate, trioctyl phosphate, tri(2-buyoxylethyl) phosphate, 2-ethylhexyl 2-ethylhexanoate, 2-ethylhexyldiphenyl phosphate, as well as other triaryl and trialkyl phosphates, epoxidized linseed oil, epoxidized soybean oil, epoxidized tall oils, ethyl 3-ethoxypropionate, fatty ester such as methyl laurate, methyl soyate, methyl myristate, and the like, fatty alcohol, rosin alcohol (e.g. Abitol E Hydroabietyl Alcohol available from Eastman Chemical Co.); rosin esters produced by reacting rosin acids (or hydrogenated rosin acids) with an alcohol such as methanol, glycerol, pentaerythritol, triethylene glycol, and the like. Examples of such rosin esters include Metalyn 200, Foralyn 5020-F, Abalyn D-E, Foral 85-E, Foralyn 90, Pentalyn H-E, Pentalyn 350-M, Permalyn 5110, Permalyn 6110, Staybelite Ester 3-E, all available from Eastman Chemical Co.

In one embodiment of the present invention, the additive can comprise at least about 20 weight percent of the water insoluble plasticizer based on the total weight of the solids in the additive. Additionally, the additive can comprise water insoluble plasticizer in the range of from about 30 to about 70 weight percent, in the range of from about 40 to about 60 weight percent, or in the range of from 45 to 55 weight percent based on the total weight of the solids in the additive.

As used herein, the water insoluble plasticizer component will be deemed to contribute to the total weight of the solids in either the additive or any coating composition, regardless of the actual physical state of the water insoluble plasticizer component. For example, if the plasticizer component is a liquid, its non-volatile components will be considered as "solids" for purposes of defining the weight percents of various components of the additive.

In another embodiment, the additive can optionally comprise an amphiphilic component. The amphiphilic component can comprise any component that displays both hydrophilic and hydrophobic properties. In one embodiment of the present invention, the additive can comprise in the range of from about 1 to about 60 weight percent, in the range of from about 2 to about 40 weight percent, or in the range of from 3 to 30 weight percent of the amphiphilic component based on the total weight of the solids in the additive. As used herein, when the amphiphilic component is present, it will be deemed to contribute to the total weight of the solids in either the additive or any coating composition, regardless of the actual physical state of the amphiphilic component. For example, if the amphiphilic component is a liquid surfactant, its non-volatile components will be considered as "solids" for purposes of defining the weight percents of various components of the additive.

In another embodiment of the present invention, the additive comprises in the range of from about 40 to about 58 weight percent of a water-dispersible polymer based on the total weight of solids in the additive, in the range of from about 40 to about 58 weight percent of a water-insoluble plasticizer based on the total weight of solids in the additive, and in the range of from about 2 to about 20 weight percent of an amphiphilic component based on the total weight of solids in said additive.

In one embodiment of the present invention, the amphiphilic component can be a surfactant. The surfactant can be ionic or non-ionic. Additionally, the surfactant can be amphoteric. In one embodiment, the surfactant can have a hydrophilic-lipophilic balance (HLB) value of at least about 3. Additionally, the surfactant can have an HLB value in the range of from about 6 to about 16. HLB values given herein are based on a scale from 0 to 20, as determined by Griffin's Method. Examples of surfactants that can be used include, but are not limited to, an alkali or ammonium salt of alkylsulfate, alkylsulfonic acid, or fatty acid; oxyethylated alkylphenol; ethoxylated alkyl amine, and mixtures thereof. A list of suitable surfactants is available in the treatise *McCutcheon's Emulsifiers & Detergents*, North American Edition and International Edition, MC Publishing Co., Glen Rock, N.J., 1993. Examples of suitable commercially available surfactants include, but are not limited to, ethoxylated tallow alkyl amine (polyoxyethylene tallow amine) available from Clariant Corp. as GENAMIN T 150M or from ICI Americas as MILSTAT N-20, and ethoxylated coco alkyl amine (polyoxyethylene coco amine) available from Akzo Nobel as ETHOMEEN C/25.

In another embodiment of the present invention, the amphiphilic component can be an amphiphilic polyester. Additionally, the amphiphilic polyester can be a liquid sulfopolyester. The liquid sulfopolyester can be any polyester comprising at least one monomer residue having a metal sulfonate group. The liquid sulfopolyester preferably has a Tg of less than about 20° C. In one embodiment, the liquid sulfopolyester can comprise the residues of one or more of a glycol monomer; a polyol monomer; a dicarboxylic acid containing monomer or an anhydride containing monomer; one or more of a monobasic fatty acid, a monobasic fatty ester, a naturally occurring oil, or a partially-saponified oil; and/or one or more of a sulfomonomer or a sulfomonomer adduct containing at least one metal sulfonate group. The preparation of the liquid sulfopolyester has been disclosed in US Patent Application 2008/0092776, the entirety of which is incorporated herein by reference.

In another embodiment of the present invention, the additive further comprises at least one cyclohexanedimethanol.

The cyclohexanedimethanol can be either 1,2, 1,3, or 1,4-cyclohexanedimethanol and mixtures thereof. The amount of the cyclohexanedimethanol can range from about 5 to about 70 weight percent, from about 15 to about 65 weight percent, or from 25 to 52 weight percent based on the total weight of the solids in the additive.

In one embodiment, the additive comprises in the range of from about 30 to about 65 weight percent of a water-dispersible polymer based on the total weight of solids in the additive, in the range of from about 5 to about 40 weight percent of a water-insoluble plasticizer based on the total weight of solids in the additive, and in the range of from about 30 to about 65 weight percent of the cyclohexanedimethanol based on the total weight of solids in the additive.

In another embodiment of the invention, the additive of the present invention may further comprise at least one rheology modifier to help stabilize the aqueous dispersion of the additive. Examples of such rheology modifier include, but are not limited to, Acrysol SCT-275, a non-ionic urethane solution available from Rohm and Haas, and the like. The amount of rheology modifier in the additive can range from about 0.1 to about 5 weight % based on the total solids of the additive or from 0.3 to 2 weight %. Besides using a rheology modifier, the stability of the aqueous dispersion of the additive can also be improved by increasing the percent solids of the additive to yield a more viscous dispersion. In one embodiment of the invention, the viscosity of the aqueous dispersion can be from about 10,000 cP to about 50,000 cP without rheology modifier.

As mentioned above, the additive of the present invention can comprise a water-dispersible polymer. The water-dispersible polymer can be a neutralized vinyl polymer. In one embodiment, the neutralized vinyl polymer can be prepared by neutralizing a vinyl polymer with a base and water in a container to produce a neutralized mixture. The container holding the neutralized mixture can then be rolled for a period of time. In one embodiment, the container can be rolled for at least 10 hours, in the range of from about 12 hours to about 48 hours. In another embodiment, the neutralized vinyl polymer can be prepared by charging a vinyl polymer, a base, and water to a reactor. The components can be subsequently mixed by any means known in the art, including, but not limited to, mechanical stirring. The mixing can be performed at ambient or elevated temperature.

In one embodiment, the amount of vinyl polymer in the neutralized mixture can be at least about 10 weight percent, in the range of from about 20 to about 50 weight percent, or in the range of from 30 to 40 weight percent based on the total weight of the mixture.

The base can be present in the neutralized mixture in any amount that can sufficiently neutralize the water dispersible polymer to lower the acid number of the polymer by at least about 40 percent, at least about 60 percent, or at least 80 percent. The total amount of solids in the neutralized mixture can be at least about 5 weight percent, in the range of from about 5 to about 50 weight percent, in the range of from about 15 to about 40 weight percent, or in the range of from about 20 to 30 weight percent based on the total weight of the neutralized mixture.

As mentioned above, the water-dispersible polymer can be a sulfopolymer. In one embodiment, the sulfopolymer can be prepared by adding a solid water-dispersible sulfopolymer to water while continuously stirring.

As mentioned above, the optional amphiphilic component of the additive can be a liquid sulfopolyester.

In one embodiment of the present invention, the additive can be prepared by blending together the water-dispersible polymer, the water insoluble plasticizer, cyclohexanedimethanol, and optionally the amphiphilic component, and any other desirable components. The blending can be accomplished by any known method in the art and in any order. In one embodiment, the additive is prepared by a method comprising the steps of (a) mixing the water-dispersible polymer, the water insoluble plasticizer, optionally the amphiphilic component, and any other desirable components, (b) heating the resulting mixture to a temperature of about 150 to 200° C. to obtain a homogeneous mixture, (c) allowing the homogeneous mixture to cool to about 80 to 120° C., and (d) adding an aqueous solution of a base to the homogeneous mixture at a suitable rate so as to obtain a homogeneous aqueous dispersion.

In one embodiment, the blending can result in an additive comprising at least about 10 weight percent of solids, in the range of from about 15 to about 75 weight percent solids, or in the range of from 20 to 50 weight percent solids, based on the total weight of the additive.

As mentioned above, the additive can have a low VOC content. In one embodiment of the invention, the additive can have a VOC content of less than about 20 weight percent, less than about 15 weight percent, or less than 10 weight percent based on the total weight of the additive. Additionally, when the additive is employed in a coating to form a coating composition, the coating composition can also have a low VOC content. The coating composition can have a VOC content of less than about 150 g/l, less than about 100 g/l, or less than 50 g/l.

Test methods for VOC regulations vary regionally. In the United States, VOC content is determined in accordance with Environmental Protection Agency (EPA) Reference Method 24, which is equivalent to ASTM D3960. VOC content in this application was determined by EPA Reference Method 24. Under this method, the total amount of volatiles is first determined, then the amount of water and exempt solvents is determined and subtracted from the total amount of volatiles to determine the amount of VOC. In the European Union, VOCs are defined within the Decopaint Directive 2004/42/CE, which states that "VOC means any organic compound having an initial boiling point less than or equal to 250° C. measured at a standard pressure of 101.3 kPa."

As mentioned above, in one embodiment of the present invention the additive can be combined with a coating to form a modified coating composition. Coatings suitable for use can be any water-based coating known in the industry, including, but not limited to, latex coatings and aqueous polyurethane dispersions. In one embodiment of the present invention, the coating composition can comprise water, at least one binder, at least one pigment, and at least one additive.

In one embodiment of the present invention, the coating composition can comprise an amount of water in the range of from about 20 to about 90 weight percent. Additionally, the coating composition can collectively comprise binder and additive in an amount in the range of from about 10 to about 80 weight percent.

The binder can be any binder known in the industry that binds pigment together and to a substrate. Examples of binders include, but are not limited to, wax, casein, egg tempera, gum arabic, linseed oil, shellac, starch glue, gelatin, dextrin, polyester, alkyd, epoxy, acrylic, polyurethane, and latex emulsion. In one embodiment, the solids of the binder can comprise at least about 5 weight percent of the total weight of the coating composition. Additionally, the solids of the binder can comprise in the range of from about 10 to about 60 weight percent, or in the range of from 20 to 40 weight percent of the total weight of the coating composition.

The pigment can be any pigment known in the industry, including natural, synthetic, organic, inorganic pigments, and mixtures thereof. Examples of suitable commercially available pigments include, but are not limited to, FLEXIVERSE aqueous dispersion pigments, available from SunChemical, and TI-PURE pigments, available from DuPont. In one embodiment of the present invention, the coating composition can comprise pigment in an amount of at least about 10 weight percent based on the total weight of the coating composition. Additionally, the coating composition can comprise pigment in an amount in the range of from about 15 to about 45 weight percent, or in the range of from 25 to 35 weight percent based on the total weight of the coating composition.

In one embodiment of the present invention, the coating composition can comprise an aqueous coating and an additive, where the coating composition comprises in the range of from about 70 to about 97 weight percent of a film-forming latex polymer and in the range of from about 3 to about 30 weight percent of the additive based on the total weight of the solids in said latex polymer and said additive. In one embodiment, the film-forming latex polymer can be any polymer formed from at least one ethylenically unsaturated monomer. Furthermore, the film-forming latex polymer can have a Tg in the range of from about −5 to about 80° C.

In one embodiment of the present invention, the coating can optionally comprise a coalescing agent. Such coalescing agent can be any agent that when employed in a coating evaporates in such a way as to form a uniform film. An example of a commercially available coalescing agent is TEXANOL, an ester-alcohol available from Eastman Chemical Company. Other coalescing agents include, but are not limited to, ethanol, n-propanol, isopropanol, n-butanol, sec-butanol, isobutanol, ethylene glycol monobutyl ether, propylene glycol methyl ether, propylene glycol monopropyl ether, dipropylene glycol methyl ether, diethylene glycol monobutyl ether, 2,2,4-trimethyl-1,3-pentanediol mono-isobutyrate, 2,2,4-trimethyl-1,3-pentanediol di-isobutyrate, benzyl alcohol, diacetone alcohol, and the like. These coalescing agents differ from the additive of the present invention in that they are volatile and typically have detrimental effects on the open-time property of the coatings.

A coating composition of the invention may further contain additional coating additives. Examples of such coating additives include, but are not limited to, one or more leveling, rheology, and flow control agents such as silicones, fluorocarbons or cellulosics; extenders; flatting agents; pigment wetting and dispersing agents and surfactants; ultraviolet light (UV) absorbers; hindered amine light stabilizers (HALS); phosphites, tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; or thickening agents. Specific examples of such additives can be found in *Raw Materials Index*, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company under the SYLOID tradename; polypropylene, available from Hercules Inc. under the HERCOFLAT tradename; and synthetic silicate, available from J. M. Huber Corporation under the ZEOLEX tradename.

Examples of dispersing agents and surfactants include, but are not limited to, sodium bis(tridecyl)sulfosuccinnate, sodium di(2-ethylhexyl) sulfosuccinnate, sodium dihexylsulfosuccinnate, sodium dicyclohexylsulfosuccinnate, sodium diamylsulfosuccinnate, sodium diisobutylsulfosuccinnate, disodium iso-decylsulfosuccinnate, the disodium ethoxylated alcohol half ester of sulfosuccinnic acid, disodium alkylamidopolyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the ANTI TERRA tradename. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water-soluble carboxylated thickeners such as, for example, UCAR POLYPHOBE thickeners from Union Carbide.

Many types of rheology modifiers are used in waterborne coatings. These can include clays, alkali-swellable emulsions (ASE), hydrophobically modified, alkali swellable emulsions (HASE), hydrophobically modified, ethoxylated urethane resins (HEUR), hydroxyethylcellulose (HEC), and hydrophobically modified hydroxyethylcellulose (HMHEC). Examples of commercial rheology modifiers include ACRYSOL™ RM-2020, ACRYSOL™ RM-5, ACRYSOL™ DR-1, ACRYSOL™ ASE-60ER, ACRYSOL™ TT-935, and ACRYSOL™ SCT-275 available from Rohm & Haas Company.

Several proprietary antifoaming agents are commercially available and include, for example, BUBREAK of Buckman Laboratories Inc., BYK (of BYK Chemie, U.S.A.), FOAMASTER and NOPCO of Henkel Corp., DREWPLUS of the Drew Industrial Division of Ashland Chemical Company, TRYSOL and TROYKYD of Troy Chemical Corporation, and SAG of Union Carbide Corporation.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyano-methylthio)benzothiazole, potassium dimethyl dithiocarbamate, adamantane, N-(trichloromethylthio)phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of UV absorbers are single compounds or mixtures of compounds that absorb light in the range of 250-400 nm with a minimal absorbance between 400 and 700 nm. Examples of UV absorbers include, but are not limited to, triazines, cyanoacrylates, benzotriazoles, naphthalenes, benzophenones, and benzoxazin-4-ones. Commercially available UV absorbers include, but are not limited to, CYASORB UV-9 (Cytec Industries, CAS#131-57-7), CYASORB UV-24 (Cytec Industries, CAS#131-53-3), CYASORB UV-531 (Cytec Industries, CAS#1843-05-6), CYASORB UV-2337 (Cytec Industries, CAS#25973-55-1), CYASORB UV-5411 (Cytec Industries, CAS#3147-75-9), CYASORB UV-5365 (Cytec Industries, CAS#2440-22-4), CYASORB UV-1164 (Cytec Industries, CAS#2725-22-6), CYASORB UV-3638

(Cytec Industries, CAS#18600-59-4), TINUVIN 213 (Ciba Specialty Chemicals, CAS#104810-47-1), TINUVIN 234 (Ciba Specialty Chemicals, CAS#70321-86-7), TINUVIN 320 (Ciba Specialty Chemicals, CAS#3846-71-7), TINUVIN 326 (Ciba Specialty Chemicals, CAS#3896-11-5), TINUVIN 327 (Ciba Specialty Chemicals, CAS#3864-99-1), TINUVIN 328 (Ciba Specialty Chemicals, CAS#25973-55-1), TINUVIN 329 (Ciba Specialty Chemicals, CAS#3147-75-9), TINUVIN 350 (Ciba Specialty Chemicals, CAS#36437-37-3), TINUVIN 360 (Ciba Specialty Chemicals, CAS#103597-45-1), TINUVIN 571 (Ciba Specialty Chemicals, CAS#23328-53-2) and TINUVIN 1577 (Ciba Specialty Chemicals, CAS#147315-50-2). Additional suitable UV absorbers are listed in the *Plastic Additives Handbook 5th Edition,* Hanser Gardner Publications, Inc., Cincinnati, Ohio, 2001. Identical molecules sold under different trade names are also covered by this invention. Additionally, combinations of UV absorbers can be used.

Examples of hindered amine light stabilizers (HALS) that may be suitable include, but are not limited to, CYASORB UV-3346 (Cytec Industries, CAS#90751-07-8), CYASORB UV-3529 (Cytec Industries, CAS#193098-40-7), CYASORB UV-3641 (Cytec Industries, CAS#106917-30-0), CYASORB UV-3581 (Cytec Industries, CAS#79720-19-7), CYASORB UV-3853 (Cytec Industries, CAS#167078-06-0), CYASORB UV-38535 (Cytec Industries, CAS#24860-22-8), TINUVIN 622 (Ciba Specialty Chemicals, CAS#65447-77-0), TINUVIN 770 (Ciba Specialty Chemicals, CAS#52829-07-9), TINUVIN 144 (Ciba Specialty Chemicals, CAS#63843-89-0), TINUVIN 123 (Ciba Specialty Chemicals, CAS#129757-67-1), CHIMASSORB 944 (Ciba Specialty Chemicals, CAS#71878-19-8), CHIMASSORB 119 (Ciba Specialty Chemicals, CAS#106990-43-6), CHIMASSORB 2020 (Ciba Specialty Chemicals, CAS#192268-64-7), LOWILITE 76 (Great Lakes Chemical Corp., CAS#41556-26-7), LOWILITE 62 (Great Lakes Chemical Corp., CAS#65447-77-0), LOWILITE 94 (Great Lakes Chemical Corp., CAS#71878-19-8), UVASIL 299LM (Great Lakes Chemical Corp., CAS#182635-99-0), UVASIL 299HM (Great Lakes Chemical Corp., CAS#182635-99-0), Dastib 1082 (Vocht a.s., CAS#131290-28-3), UVINUL 4049H (BASF Corp., CAS#109423-00-9), UVINUL 4050H (BASF Corp., CAS#124172-53-8), UVINUL 5050H (BASF Corp., CAS#199237-39-3), MARK LA 57 (Asahi Denka Co., Ltd., CAS#64022-61-3), MARK LA 52 (Asahi Denka Co., Ltd., CAS#91788-83-9), MARK LA 62 (Asahi Denka Co., Ltd., CAS#107119-91-5), MARK LA 67 (Asahi Denka Co., Ltd., CAS#100631-43-4), MARK LA 63 (Asahi Denka Co., Ltd. Co., Ltd. Co., CAS#115055-30-6), MARK LA 68 (Asahi Denka Co., Ltd., CAS#100631-44-5), HOSTAVIN N 20 (Clariant Corp., CAS#95078-42-5), HOSTAVIN N 24 (Clariant Corp., CAS#85099-51-1, CAS#85099-50-9), HOSTAVIN N 30 (Clariant Corp., CAS#78276-66-1), DIACETAM-5 (GTPZAB Gigiena Truda, USSR, CAS#76505-58-3), UVASORB-HA 88 (3V Sigma, CAS#136504-96-6), GOODRITE UV-3034 (BF Goodrich Chemical Co., CAS#71029-16-8), GOODRITE UV-3150 (BF Goodrich Chemical Co., CAS#96204-36-3), GOODRITE UV-3159 (BF Goodrich Chemical Co., CAS#130277-45-1), SANDUVOR 3050 (Clariant Corp., CAS#85099-51-0), SANDUVOR PR-31 (Clariant Corp., CAS#147783-69-5), UV CHECK AM806 (Ferro Corp., CAS#154636-12-1), SUMISORB TM-061 (Sumitomo Chemical Company, CAS#84214-94-8), SUMISORB LS-060 (Sumitomo Chemical Company, CAS#99473-08-2), UVASIL 299 LM (Great Lakes Chemical Corp., CAS#164648-93-5), UVASIL 299 HM (Great Lakes Chemical Corp., CAS#164648-93-5), and NYLOSTAB S-EED (Clariant Corp., CAS#42774-15-2). Additional hindered amine light stabilizer may be listed in the *Plastic Additives Handbook 5th Edition,* Hanser Gardner Publications, Inc., Cincinnati, Ohio, 2001.

Examples of phosphites include, but are not limited to, compounds sold under the following brand names: IRGAFOS TNPP (Ciba Specialty Chemicals, CAS#26523-78-4), IRGAFOS 168 (Ciba Specialty Chemicals, CAS#31570-04-4), ULTRANOX 626 (GE Specialty Chemicals, CAS#26741-53-7), MARK PEP 36 (Asahi Denka Co., Ltd., CAS#80693-00-1), MARK HP-10 (Asahi Denka Co., Ltd., CAS#140221-14-3), IRGAFOS P-EPQ (Ciba Specialty Chemicals, CAS#38613-77-3), SANDOSTAB P-EPQ (Clariant Corp., CAS#119345-01-6), ETHANOX 398 (Albemarle Corp., CAS#118337-09-0), WESTON 618 (GE Specialty Chemicals, CAS#3806-34-6), IRGAFOS 12 (Ciba Specialty Chemicals, CAS#80410-33-9), IRGAFOS 38 (Ciba Specialty Chemicals, CAS#145650-60-8), ULTRANOX 641 (GE Specialty Chemicals, CAS#161717-32-4), DOVERPHOS S-9228 (Dover Chemical Corp. CAS#154862-43-8), and the like.

As mentioned above, the additive can be employed in a coating so as to improve the coating's properties when being applied to a substrate and upon drying. Substrates that can be used in the present invention are any substrates known in the industry to which a coating can be applied such as, but not limited to, wood, drywall, paper, polyester films such as polyethylene and polypropylene, metals such as aluminum and steel, glass, urethane elastomers, primed (painted) substrates, and the like.

In one embodiment, the coating composition, when being applied to a substrate, can have improved properties including, but not limited to, wet edge time, open time, block resistance, gloss, scrub resistance, tack-free time, and dry-to-touch time. As used herein, the term "wet edge time" is defined as the period of time that the edge region of an applied coating remains workable after it has been applied to a substrate. For example, during this period of time, re-brushing or application of more coating over the edge region of a freshly coated wet substrate is possible without causing defects, such as lap lines, in the final dried coating. Wet edge time is determined in accordance with the description provided below in the Test Methods section of the Examples. In one embodiment of the present invention, the coating composition can have a wet edge time of at least about 1.5 minutes, at least about 3 minutes, or at least 5 minutes.

As used herein, the term "open time" is defined as the period of time that the main area (the bulk) of an applied coating remains workable after it has been applied to a substrate. For example, during this period of time, re-brushing or application of more coating over the main area of a freshly coated wet substrate is possible without causing defects, such as brush marks, in the final dried coating. Open time is determined in accordance with the description provided below in the Test Methods section of the Examples. In one embodiment of the present invention, the coating composition can have an open time of at least about 2 minutes, at least about 5 minutes, or at least 8 minutes.

As used herein, the term "block resistance" is defined as the capability of a coating, when applied to two facing surfaces, not to stick to itself upon contact when pressure is applied, such as, for example, when coating a door and a door jamb. Block resistance is measured on a scale of 0 to 10, with 10 being the best (i.e., the coating shows no signs of sticking to itself). Block resistance can be measured after a certain time interval, typically measured in days. Block resistance is determined according to ASTM Method D4946-89. In one embodiment of the present invention, the coating composition can have a 7 day block resistance of at least about 3, or at least 6.

As used herein, the term "scrub resistance" is defined as the number of scrub cycles required to erode a coating to the substrate. Scrub resistance is determined according to ASTM Method D-2486. In one embodiment of the present invention, the coating composition can have a scrub resistance of at least about 500 cycles, at least about 700 cycles, or at least 1,000 cycles.

EXAMPLES

The following examples are intended to be illustrative of the present invention in order to teach one of ordinary skill in the art to make and use the invention and are not intended to limit the scope of the invention in any way.

Test Methods

Open Time and Wet Edge Time Test

A one inch polyester paint brush with a flat tip is wet with water. It is rolled in stack of paper towel to remove excess moisture. The brush is left in the moist towels until needed. A 3 mil Bird Bar film applicator (Gap 0.006 inch) (Paul N. Gardner Company, Inc., 316 Northeast First Street, Pompano Beach, Fla., 33060) is centered at the top of a LENETA plain black chart, form 125 BH (The Leneta Company, 15 Whitney Road, Mahwah, N.J., 07430). Wet paint is placed from the center of the applicator in a thin line to about half way down the chart. The paint is then applied to the chart with the applicator, and immediately a stop watch is started. Starting at the top of the drawdown, the wet paint coating is scored three times side by side in the center of the drawdown using a tongue depressor. This process is repeated every two to three inches to the bottom of the drawdown. The pre-wet paint brush is loaded with paint so that the brush is full but not dripping. At specified time intervals, usually every 1 to 2 minutes, paint is applied across one set of the scored lines for 4 cycles using the loaded paint brush. The brush is re-loaded with paint after each time interval. The test panels are dried before judging. Open time failure is judged to be the first time interval at which the center lines are visible after drying. Wet edge failure time is judged to be the first time interval at which the edge of the drawdown is visible. Both right and left wet edge failure times are reported.

VOC Testing

Volatile organic compounds (VOC) testing was carried out in accordance with EPA Reference Method 24 (ASTM D3960). Small (~0.5 gram) samples of each material to be tested were measured into a pre-weighed aluminum pan. The aluminum pan was then placed in a forced air oven for 60 minutes at 110° C. The percentage of material that was lost during this test is deemed to be volatile. Next, the amount of water and exempt solvents is determined under Method 24 and subtracted from the total amount of volatiles to determine the amount of VOC in the sample.

Heated Block Test

The block resistance was determined using ASTM Method D 4946-89. Paint is applied to a LENETA opacity chart, form N-2C (The Leneta Company, 15 Whitney Road, Mahwah, N.J., 07430) using a 3 mil bird type film applicator (Paul N. Gardner Company, Inc., 316 North East First Street, Pompano Beach, Fla., 33060). The panel is dried and stored at 50 percent relative humidity and 23.8° C. At a specified time, three 1.5 by 1.5 inch squares are cut from the test panel. The test panel is placed in a 50° C. oven. The painted side of each square is placed onto the painted face of the test panel. A #8 rubber stopper is placed on each square, and then a 1000 g weight is placed on top of the stopper. Both weights and stoppers have been previously heated to 50° C. The sample is left undisturbed for 30 minutes, and then the weight and stopper are removed. The sample is allowed to cool at 50 percent relative humidity and 23.8° C. for 30 minutes. The squares are then separated. Each sample is then rated according to the scale given below:

TABLE 1

Block Resistance Rating

| NUMERICAL RATING | TYPE OF SEPARATION | PERFORMANCE |
| --- | --- | --- |
| 10 | No tack | Perfect |
| 9 | Trace tack | Excellent |
| 8 | Very slight tack | Very good |
| 7 | Very slight to slight tack | Good to very good |
| 6 | Slight tack | Good |
| 5 | Moderate tack | Fair |
| 4 | Very tacky; no seal | Poor to fair |
| 3 | 5 to 25% seal | Poor |
| 2 | 25 to 50% seal | Poor |
| 1 | 50 to 75% seal | Very poor |
| 0 | 75 to 100% seal | Very poor |

Scrub Resistance Test

Scrub Resistance testing was done using ASTM Method D 2486-00 entitled *Standard Test Methods for Scrub Resistance of Wall Paints*.

Viscosity Testing

The viscosity of the paints was measured using a STORMER viscometer (ASTM Method D-562-01, Method B) and an ICI cone and plate viscometer (ASTM Method D4287-00). Both instruments are available from Paul N. Gardner Company, Inc., 316 North East First Street, Pompano Beach, Fla., 33060.

Wet Adhesion Test

Panel Preparation:

Devguard 4308 Alkyd Industrial Gloss Enamel paint, medium green, (ICI DEVOE High Performance Coatings) was applied to Scrub Test Panels, Form P 121-10N (The Leneta Company, 15 Whitney Road, Mahwah, N.J., 07430) with a 3 mil Bird Bar applicator (Paul N. Gardner Company, Inc., 316 North East First Street, Pompano Beach, Fla., 33060). The panels were air cured for 3 to 6 weeks at a relative humidity of 50% and a temperature of 23.8° C. Test paint was applied to the cured panels using a 3 mil Bird Bar applicator. The test paint panels were cured at a relative humidity of 50% and a temperature of 23.8° C.

Testing:

Each test paint panel was scored using a multi-tooth cutter blade from a Model P-A-T Paint Adhesion Test Kit (Paul N. Gardner Company, Inc., 316 North East First Street, Pompano Beach, Fla., 33060) in accordance with ASTM Method D-3359, Method B. The scored panels were conditioned at a humidity of 100% for 1 hr. at room temperature. The panels were removed and patted dry with a paper towel. Immediately Scotch 600 tape was applied across the score. The tape was rubbed firmly to insure good contact. The tape was pulled back quickly and smoothly at an angle of about 180 degrees.

Wet Adhesion was judged as follows:

| Rating | Description |
| --- | --- |
| 5 | 0% loss |
| 4 | 10% loss |

| Rating | Description |
| --- | --- |
| 3 | 50% loss |
| 0 | 100% loss |

The results can be reported in increments of 0.1.

Example 1

Preparation of Dispersion 1 of Water-Dispersible Polymer

The following ingredients were placed in a quart wide-mouthed jar:
- 150.0 g JONCRYL 67 vinyl polymer (acid number, 213 mg KOH/g; Tg 73° C.; BASF Corporation)
- 46.9 g Ammonium Hydroxide (28% $NH_3$ in water), and
- 303.1 g Demineralized Water The above mixture was placed on a roller inside a cabinet with a controlled temperature at 50° C. for a period of time to obtain a homogeneous aqueous dispersion (30% solids).

Example 2

Preparation of the Master Batch Base for Paint Formulations

A master batch of paint base containing binder and pigment was prepared by mixing the following ingredients according to the order of addition as listed in Table 2 using a high speed mixer equipped with a Cowles blade.

TABLE 2

Preparation of Master Batch of Paint Base

| INGREDIENT NAME | Supplier | WEIGHT (lb) | CONCENTRATION (wt. %) |
| --- | --- | --- | --- |
| TI-PURE R-746 Pigment Slurry | DuPont | 7.752 | 44.35 |
| KATHON LX microbiocide, 1.5% | Rohm and Haas Company | 0.043 | 0.24 |
| RHOPLEX SG-30 Latex (binder) | Rohm and Haas Company | 9.596 | 54.90 |
| Aerosol OT-75 surfactant | Cytec Industries Inc. | 0.038 | 0.22 |
| BYK-022 defoamer | BYK-Chemie | 0.050 | 0.29 |
| Total | | 17.479 | 100.00 |

Example 3

Preparation of Control Paints

Two control paint formulations were prepared by mixing the following ingredients according to the order of addition as listed in Table 3. Control 1 did not contain any open-time additive, while control 2 contained propylene glycol, a conventional open-time additive. Propylene glycol used in control 2 was in an amount of 3 weight % based on the total weight of the formulation. The pigment volume concentration (PVC), pigment to binder ratio (pigment/binder), and VOC content were determined by calculation for each formulation. Table 4 lists the coating properties of the two control paint formulations.

TABLE 3

Preparation of the Control Paint Formulations

| | | Paint Formulation | |
| --- | --- | --- | --- |
| | | Control 1 | Control 2 |
| Master Batch (g) | | 350.00 | 350.00 |
| Water(g) | | 83.06 | 60.00 |
| Rhoplex SG-30 Latex(g) | Rohm and Haas Company | 50.00 | 50.00 |
| Propylene Glycol (g) (conventional open time additive) | | — | 15 |
| Texanol(g) (coalescing agent) | Eastman Chemical Company | 5.50 | 5.5 |
| Acrysol SCT-275 (rheology modifier) (g) | Rohm and Haas Company | 1.05 | 2.34 |
| Acrysol RM-2020 (rheology modifier) (g) | Rohm and Haas Company | 11.11 | 12.06 |
| Water(g) | | 1.55 | 6.44 |
| Total (g) | | 502.27 | 501.34 |
| Properties: | | | |
| PVC | | 21.23 | 21.18 |
| Pigment/Binder | | 0.94 | 0.93 |
| VOC (g/L) | | 40 | 133 |

TABLE 4

Coating Properties of the Control Paint Formulations

| Coating Properties Open Time Failure: | Control 1 | Control 2 |
| --- | --- | --- |
| Right Edge, minutes | <1.0 | 1.5 |
| Left Edge, minutes | 2 | 2.5 |
| Middle, minutes | 1.5 | 6 |
| Scrub Resistance (relative to control 2) | 91% | 100% |
| Wet Adhesion | | 5 |
| Heated Block (After 5 week cure) | | 8 |

Example 4

Preparation and Evaluation of Various Paint Formulations Containing Open-Time Additives Two paint formulations were prepared by mixing the following ingredients according to the order of addition as listed in Table 5. Formulation 1 was based on Joncryl 67 dispersion prepared in Example 1 as the open-time additive, while formulation 2 based on Eastman TEG-EH Plasticizer [tri(ethylene glycol) bis(2-ethylhexanoate)], a commercial plasticizer available from Eastman Chemical Company. The open-time additive in each formulation was calculated to be 3 wt. % based on the 100% material (i.e. Joncryl 67 and TEG-EH respectively) of the additive and the total weight of the paint formulation. The pigment volume concentration (PVC), pigment to binder ratio (pigment/binder), and VOC content were determined by calculation for each formulation.

TABLE 5

Preparation of Paint Formulations

| Paint Formulation | 1 | 2 |
| --- | --- | --- |
| Master Batch (g) | 350 | 350 |
| Water(g) | 21.6 | 71.1 |
| Rhoplex SG-30 Latex (g) | 50 | 50 |

TABLE 5-continued

Preparation of Paint Formulations

| Paint Formulation | 1 | 2 |
|---|---|---|
| Joncryl 67 vinyl polymer (Dispersion 1) (g) | 50 | — |
| TEG-EH Plasticizer (g) | — | 15 |
| Texanol (coalescing agent) (g) | 5.5 | 5.5 |
| Acrysol SCT-275 (rheology modifier) (g) | 5.15 | 0.59 |
| Acrysol RM-2020 (rheology modifier) (g) | 23.07 | 10.38 |
| Water(g) | 0 | 2.13 |
| Total (g) | 505.32 | 504.7 |
| Properties: | | |
| PVC | 19.11 | 19.11 |
| Pigment/Binder | 0.82 | 0.84 |
| VOC (g/L) | 43 | 36 |

The following paint formulations were prepared by blending formulations 1 and 2 above at various ratios as listed in Table 6. This resulted in paint formulations having various ratios of Joncryl 67 vinyl polymer and TEG-EH plasticizer functioning as the inventive open-time additive. The coating properties of the paint formulations thus prepared are listed in Table 6.

TABLE 6

Preparation of Various Paint Formulations and Their Coating Properties

| Paint Formulation | Control 3 | 4 | 5 | 6 | 7 | Control 8 |
|---|---|---|---|---|---|---|
| Paint 1/Paint 2, % | 100/0 | 80/20 | 70/30 | 60/40 | 50/50 | 0/100 |
| Joncryl 67/TEG-EH (% of each based on the total weight of the paint) | 3.0/0.0 | 2.4/0.6 | 2.1/0.9 | 1.8/1.2 | 1.5/1.5 | 0.0/3.0 |
| Properties | | | | | | |
| Open Time Failure: | | | | | | |
| Right Edge, minutes | 5 | 5 | 6 | 5 | 5 | 0.5 |
| Left Edge, min. | 5 | 6 | 6 | 6 | 5 | 0.5 |
| Middle, min. | 7 | 7 | 8 | 7 | 7 | 2 |
| Scrub Resistance (%, relative to control 2) | 52 | 94 | 101 | 100 | 113 | 192 |
| Wet Adhesion | 5 | 1 | 3.9 | 4.8 | 5 | — |
| Hot Block (after 7 day cure) | 7 | 7 | 6 | 5 | 4 | — |

Example 5

Preparation of Aqueous Dispersion 2 of the Additive Containing Water-Dispersible Polymer and Water-Insoluble Plasticizer (Neutralized with Potassium Hydroxide)

Joncryl 67 vinyl polymer (water-dispersible polymer) (30 g) and tri(ethylene glycol) bis(2-ethylhexanoate) (TEG-EH) water-insoluble plasticizer (30 g) were charged to a 500 ml three-neck round bottom flask equipped with a mechanical stirrer, a water condenser, and a nitrogen inlet. The mixture was stirred and gradually heated to 150-200° C. to yield a homogeneous mixture, which was then allowed to cool to about 120° C. A solution of potassium hydroxide in water (10%, 50 g) was then dripping slowly through an addition funnel to the mixture. The addition rate was increased after the temperature dropped below 100° C. The addition was allowed to continue at 80-90° C. The mixture first became creamy and then more transparent. After the potassium hydroxide solution was added, additional water (20 g) was added dropwise to yield a white viscous dispersion.

Example 6

Preparation of Aqueous Dispersion 3 of the Additive Containing Water-Dispersible Polymer and Water-Insoluble Plasticizer (Neutralized with Ammonium Hydroxide)

Joncryl 67 vinyl polymer (30 g) and tri(ethylene glycol) bis (2-ethylhexanoate) (TEG-EH) (30 g) (water-insoluble plasticizer) were charged to a 500 ml three-neck round bottom flask equipped with a mechanical stirrer, a water condenser, and a nitrogen inlet. The mixture was stirred and gradually heated to 150-200° C. to yield a homogeneous mixture, which was then allowed to cool to about 120° C. A solution of ammonium hydroxide (30%, 5 g) and water (50 g) was then dripping slowly through an addition funnel to the mixture. The addition rate was increased after the temperature dropped below 100° C. The addition was allowed to continue at 80-90° C. The mixture first became creamy and then more transparent. After the ammonia solution was added, additional water (20 g) was added dropwise to yield a white viscous dispersion.

Example 7

Preparation and Evaluation of Paint Formulations

Two paint formulations were prepared by mixing the following ingredients according to the order of addition as listed in Table 7. Formulation 9 was based on Joncryl 67/TEG-EH dispersion 2 prepared in Example 5 as the open-time additive, while formulation 10 based on Joncryl 67/TEG-EH dispersion 3 prepared in Example 6. The open-time additive in each formulation was calculated to be 3 wt. % based on the 100% material (i.e. the weight of Joncryl 67 and TEG-EH in the dispersions) of the additive and the total weight of the paint formulation. The pigment volume concentration (PVC), pigment to binder ratio (pigment/binder), and VOC content were determined by calculation for each formulation. The coating properties of the paint formulations are listed in Table 8.

TABLE 7

Preparation of Paint Formulations

| Paint Formulation | 9 | 10 |
|---|---|---|
| Master Batch (g) | 308.47 | 350 |
| Water(g) | 43.52 | 35 |
| Joncryl 67/TEG-EH (Dispersion 2) | 27.79 | |
| Joncryl 67/TEG-EH (Dispersion 3) | | 34.1 |
| Rhoplex SG-30 Latex(g) | 44.07 | 50 |
| Texanol (coalescing agent) (g) | 4.8 | 5.5 |
| Acrysol SCT-275 (rheology modifier) (g) | 1.77 | 2.11 |
| Acrysol RM-2020 (rheology modifier) (g) | 12.02 | 15.65 |
| Water(g) | 0 | 10.04 |
| Total (g) | 442.44 | 502.4 |
| Properties: | | |
| PVC | 19.16 | 19.06 |
| Pigment/Binder | 0.83 | 0.83 |
| VOC (g/L) | 38 | 39 |

TABLE 8

Coating Properties of Paint Formulations

| Coating Properties Open Time Failure: | Formulation 9 | Formulation 10 |
|---|---|---|
| Right Edge, minutes | 4 | 5 |
| Left Edge, minutes | 3 | 5 |
| Middle, minutes | 6 | 5 |
| Scrub Resistance (%, relative to control 2) | 100 | 100 |
| Wet Adhesion | 5 | 5 |
| Hot Block (after 7 day cure) | 0 | 4 |

Example 8

Preparation of Aqueous Dispersion 4 of the Additive Containing Water-Dispersible Polymer and Water-Insoluble Plasticizers Joncryl 67 vinyl polymer (60 g), tri(ethylene glycol) bis(2-ethylhexanoate) (TEG-EH) plasticizer (30 g), and Abitol E Hydroabietyl Alcohol (plasticizer) (Eastman Chemical Co.) (30 g) were charged to a one-liter three-neck round bottom flask equipped with a mechanical stirrer, a water condenser, and a nitrogen inlet. The mixture was stirred and gradually heated to 150-200° C. to yield a homogeneous mixture, which was then allowed to cool to about 120° C. A solution of ammonium hydroxide (30%, 10 g) and water (100 g) was then dripping slowly through an addition funnel to the mixture. The addition rate was increased after the temperature dropped below 100° C. The addition was allowed to continue at 80-90° C. The mixture first became creamy and then more transparent. After the ammonia solution was added, additional water (40 g) was added dropwise to yield a white viscous dispersion.

Example 9

Preparation of Aqueous Dispersion 5 of the Additive Containing Water-Dispersible Polymer and Water-Insoluble Plasticizer Joncryl 67 vinyl polymer (60 g) and Abitol E Hydroabietyl Alcohol (plasticizer) (Eastman Chemical Co.) (60 g) were charged to a one-liter three-neck round bottom flask equipped with a mechanical stirrer, a water condenser, and a nitrogen inlet. The mixture was stirred and gradually heated to 150-200° C. to yield a homogeneous mixture, which was then allowed to cool to about 120° C. A solution of ammonium hydroxide (30%, 10 g) and water (100 g) was then dripping slowly through an addition funnel to the mixture. The addition rate was increased after the temperature dropped below 100° C. The addition was allowed to continue at 80-90° C. The mixture first became creamy and then more transparent. After the ammonia solution was added, additional water (40 g) was added dropwise to yield a white dispersion.

Example 10

Preparation of Aqueous Dispersion 6 of the Additive Containing Water-Dispersible Polymer and Water-Insoluble Plasticizer Joncryl 67 vinyl polymer (60 g), triethyl citrate (plasticizer) (30 g), and Abitol E Hydroabietyl Alcohol (plasticizer) (Eastman Chemical Co.) (60 g) were charged to a one-liter three-neck round bottom flask equipped with a mechanical stirrer, a water condenser, and a nitrogen inlet. The mixture was stirred and gradually heated to 150-200° C. to yield a homogeneous mixture, which was then allowed to cool to about 120° C. A solution of ammonium hydroxide (30%, 10 g) and water (100 g) was then dripping slowly through an addition funnel to the mixture. The addition rate was increased after the temperature dropped below 100° C. The addition was allowed to continue at 80-90° C. The mixture first became creamy and then more transparent. After the ammonia solution was added, additional water (60 g) was added dropwise to yield a white dispersion.

Example 11

Preparation of Aqueous Dispersion 7 of the Additive Containing Water-Dispersible Polymer and Water-Insoluble Plasticizers Joncryl 67 vinyl polymer (60 g), tri(ethylene glycol) bis(2-ethylhexanoate) plasticizer (TEG-EH) (34 g), and Eastman SAIB (Eastman Chemical Co.) (sucrose acetate isobutyrate, 26 g) (plasticizer) were charged to a one-liter three-neck round bottom flask equipped with a mechanical stirrer, a water condenser, and a nitrogen inlet. The mixture was stirred and gradually heated to 150-200° C. to yield a homogeneous mixture, which was then allowed to cool to about 120° C. A solution of ammonium hydroxide (30%, 10 g) and water (100 g) was then dripping slowly through an addition funnel to the mixture. The addition rate was increased after the temperature dropped below 100° C. The addition was allowed to continue at 80-90° C. The mixture first became creamy and then more transparent. After the ammonia solution was added, additional water (40 g) was added dropwise to yield a white viscous dispersion.

Example 12

Preparation and Evaluation of Paint Formulations

Four experimental paint formulations were prepared by mixing the following ingredients according to the order of addition as listed in Table 9. Formulation 11 was based on the Joncryl 67/TEG-EH/Abitol E dispersion 4 prepared in Example 8 as the open time additive. Formulation 12 was based on the Joncryl 67/Abitol E dispersion 5 prepared in Example 9 as the open time additive. Formulation 13 was based on the Joncryl 67/triethyl citrate/Abitol E dispersion 6 prepared in Example 10 as the open time additive. Formulation 14 was based on the Joncryl 67/TEG-EH/sucrose acetate isobutyrate dispersion 7 prepared in Example 11 as the open time additive. The open-time additive in each formulation was calculated to be 3 wt. % based on the 100% material (i.e. the weight of Joncryl 67, TEG-EH, Abitol E, triethyl citrate, and sucrose acetate isobutyrate in the dispersions) of the additive and the total weight of the paint formulation. An additional control formulation (formulation 15) with propylene glycol at 3% is provided for reference. The relevant coating performance data is listed in Table 10.

TABLE 9

Preparation of Paint Formulations

| | Paint Formulation | | | | |
|---|---|---|---|---|---|
| | 11 | 12 | 13 | 14 | 15 - PG control |
| Master Batch (g) | 175 | 175 | 175 | 175 | 350 |
| Water(g) | 20 | 20 | 20 | 20 | 60 |
| Joncryl 67/TEG-EH/Abitol (Dispersion 4) | 16.7 | | | | |
| Joncryl 67/Abitol E (Dispersion 5) | | 16.7 | | | |
| Joncryl 67/Triethyl citrate/Abitol E (Dispersion 6) | | | 16.9 | | |
| Joncryl 67/TEG-EH/SAIB/(Dispersion 7) | | | | 16.7 | |
| Propylene glycol | | | | | 15 |
| Rhoplex SG-30 Latex(g) | 25 | 25 | 25 | 25 | 50 |
| Texanol (coalescing agent) (g) | 2.75 | 2.75 | 2.75 | 2.75 | 5.5 |
| Acrysol SCT-275 (rheology modifier) (g) | 2.04 | 0.97 | 1.92 | 1.74 | 2.34 |
| Acrysol RM-2020 (rheology modifier) (g) | 7.71 | 8.64 | 7.57 | 7.17 | 12.06 |
| Water(g) | 4.26 | 2.14 | 4.1 | 5.38 | 6.44 |
| Total (g) | 253.46 | 251.2 | 253.24 | 253.74 | 501.34 |

TABLE 10

Coating Properties of Paint Formulations

| Coating Properties Open Time Failure: | 11 | 12 | 13 | 14 | 15 - PG control |
|---|---|---|---|---|---|
| Right Edge, minutes | <1.5 | 2.5 | <1.5 | 1.5 | 1.5 |
| Left Edge, minutes | 3 | 4 | 3 | 2.5 | 2.5 |
| Middle, minutes | 3 | 5 | 3 | 3 | 6 |
| Scrub Resistance (%, relative to control 15) | 83.9 | 90.0 | 87.2 | 77.6 | 100 (control) |
| Wet Adhesion | 5 | 5 | 5 | 5 | 5 |
| Hot Block (after 7 day cure) | 7.7 | 8 | 7 | 7 | 8 |

Example 13

Preparation of Aqueous Dispersion 8 of Joncryl-67/TEG-EH/CHDM (47/10/43 wt. %)

Joncryl 67 vinyl polymer (211.5 g), tri(ethylene glycol) bis (2-ethylhexanoate) (TEG-EH) plasticizer (45.0 g), and 1,4-cyclohexanedimethanol (CHDM) (193.5 g) were charged to a one-liter three-neck round bottom flask equipped with a mechanical stirrer, a water condenser, and a nitrogen inlet. The mixture was stirred and gradually heated to 80-90° C. to yield a homogeneous mixture. A solution of ammonium hydroxide (30%, 58.5 g) and water (135 g) was then dripping slowly through an addition funnel to the mixture. The addition was allowed to continue at 80-90° C. until a homogeneous dispersion was obtained. Acrysol SCT-275, a rheology modifier (9.0 g) was then added to yield a viscous dispersion. % Solids=70; pH=8.5; Brookfield viscosity=7600 cP.

Example 14

Preparation of Aqueous Dispersion 9 of Joncryl-67/TEG-EH/CHDM (30/25/45 wt. %)

Joncryl 67 vinyl polymer (135.0 g), tri(ethylene glycol) bis (2-ethylhexanoate) (TEG-EH) plasticizer (112.5 g), and 1,4-cyclohexanedimethanol (CHDM) (202.5 g) were charged to a one-liter three-neck round bottom flask equipped with a mechanical stirrer, a water condenser, and a nitrogen inlet. The mixture was stirred and gradually heated to 130-150° C. to yield a homogeneous mixture, which was then allowed to cool to about 90° C. A solution of ammonium hydroxide (30%, 37.3 g) and water (155.6 g) was then dripping slowly through an addition funnel to the mixture. The addition was allowed to continue at 80-90° C. until a homogeneous dispersion was obtained. Acrysol SCT-275, a rheology modifier (9.0 g) was then added to yield a viscous dispersion. % Solids=70; pH=8.9; Brookfield viscosity=2400 cP.

Example 15

Preparation of Aqueous Dispersion 10 of Joncryl-67/TEG-EH/CHDM (32/11/57 wt. %)

Joncryl 67 vinyl polymer (144.0 g), tri(ethylene glycol) bis (2-ethylhexanoate) (TEG-EH) plasticizer (49.5 g), and 1,4-cyclohexanedimethanol (CHDM) (256.5 g) were charged to a one-liter three-neck round bottom flask equipped with a mechanical stirrer, a water condenser, and a nitrogen inlet. The mixture was stirred and gradually heated to 130-150° C. to yield a homogeneous mixture, which was then allowed to cool to about 90° C. A solution of ammonium hydroxide (30%, 39.8 g) and water (126.7 g) was then dripping slowly through an addition funnel to the mixture. The addition was allowed to continue at 80-90° C. until a homogeneous dispersion was obtained. Acrysol SCT-275, a rheology modifier (9.0 g) was then added to yield a viscous dispersion. % Solids=74; pH=8.8; Brookfield viscosity=1760 cP.

Example 16

Preparation and Performance of Paint Formulations

Three paint formulations were prepared by mixing the following ingredients according to the order of addition as listed in Table 11. Formulation 16 was prepared using dispersion 8 from example 13. Formulation 17 was prepared using dispersion 9 from example 14. Formulation 18 was prepared using dispersion 10 from example 15. The open-time additive in each formulation was calculated to be 3 wt. % based on the 100% material (i.e. the weight of Joncryl 67, TEG-EH and CHDM in the dispersions) of the additive and the total weight of the paint formulation. An additional control formulation (formulation 19) with propylene glycol at 3% is provided for reference. The relevant coating performance data is listed in Table 12.

TABLE 11

Preparation of Paint Formulations

| | Paint Formulation | | | |
|---|---|---|---|---|
| | 16 | 17 | 18 | 19 - PG control |
| Master Batch (g) | 175 | 175 | 175 | 1884.95 |
| Water (g) | 30.00 | 26.51 | 26.74 | 358.40 |
| Dispersion 8 (Example 13) | 10.71 | | | |
| Dispersion 9 (Example 14) | | 10.85 | | |
| Dispersion 10 (Example 15) | | | 10.27 | |
| Propylene glycol | | | | 80.82 |
| Rhoplex SG-30 Latex (g) | 25 | 25 | 25 | 269.68 |
| Texanol (coalescing agent) (g) | 2.75 | 2.75 | 2.75 | 29.68 |
| Acrysol SCT-275 (rheology modifier) (g) | 1.98 | 1.78 | 1.75 | 12.68 |
| Acrysol RM-2020 (rheology modifier) (g) | 9.39 | 8.35 | 8.49 | 64.97 |
| Total (g) | 254.83 | 250.24 | 250.00 | 2700.88 |

TABLE 12

Coating Properties of Paint Formulations

| Coating Properties Open Time Failure: | 16 | 17 | 18 | 19 - PG control |
|---|---|---|---|---|
| Right Edge, minutes | 4 | 3 | 3 | 2 |
| Left Edge, minutes | 6 | 6 | 6 | 4 |
| Middle, minutes | 7 | 6 | 6 | 5 |
| Scrub Resistance (%, relative to control 19) | 165 | 200 | 156 | 100 (control) |
| Hot Block (after 7 day cure) | 6.3 | 6.0 | 6.3 | 7.0 |

DEFINITIONS

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "amphiphilic" refers to a material that has both hydrophilic and hydrophobic properties.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise."

As used herein, the term "glass transition temperature" or "Tg" refers to the temperature below which the polymer becomes rigid and brittle, and can crack and shatter under stress.

As used herein, the terms "having," "has," and "have" have the same open-ended meaning as "comprising," "comprises," and "comprise."

As used herein, the terms "including," "includes," and "include" have the same open-ended meaning as "comprising," "comprises," and "comprise."

As used herein, the term "polyol" refers to a chemical compound with at least two hydroxyl functional groups.

As used herein, the term "salt" refers to a compound comprising a positive ion and a negative ion, wherein the compound retains overall charge neutrality.

As used herein, the term "water" refers to deionized water, tap water, and any mixture thereof.

As used herein, the term "water-dispersible" refers to the property of a substance that allows it to be dispersible in a liquid comprising a polar material, such as, for example, water.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

That which is claimed is:

1. An additive composition comprising:
   a) a water-dispersible polymer comprising a neutralized vinyl polymer or a sulfopolymer, present in an amount of from about 30 to 70 weight percent, based on the total weight of solids in said additive composition, said water-dispersible polymer having a Tg in the range of from about 20° C. to about 160° C.;
   b) a water-insoluble plasticizer in an amount of 20 to 70 weight percent, based on the total weight of solids in said additive composition, said water-insoluble plasticizer having a molecular weight of less than about 1000 g/mole, wherein the water-insoluble plasticizer is selected from the group consisting of tri(ethylene glycol) bis(2-ethylhexanoate), tri(ethylene glycol) bis(n-octanoate), tetra(ethylene glycol) bis(2-ethylhexanoate), tetra(ethylene glycol) dihexanoate, di(propylene glycol) bis(2-ethylhexanoate); tri(propylene glycol) bis(2-ethylhexanoate), and tri(propylene glycol) dihexanoate; and,
   c) at least one cyclohexanedimethanol,
   wherein said additive composition has a VOC content of less than about 20 weight percent based on the total weight of said additive composition, and wherein said additive composition is an aqueous dispersion.

2. The additive composition of claim 1, wherein said additive composition comprises said water-dispersible polymer in the range of from about 40 to 60 weight percent based on the total weight of solids in said additive composition, and comprises said water-insoluble plasticizer in an amount of 20 to 60 weight percent based on the total weight of solids in said additive composition.

3. The additive composition of claim 1, wherein said additive composition further comprises an amphiphilic component.

4. The additive composition of claim 3, wherein said additive composition comprises said amphiphilic component in the range of from about 2 to about 40 weight percent based on the total weight of solids in said additive composition.

5. The additive composition of claim 3, wherein said additive composition comprises said water-dispersible polymer in the range of from about 40 to about 58 weight percent based on the total weight of solids in said additive composition, and said amphiphilic component in the range of from about 2 to about 20 weight percent based on the total weight of solids in said additive composition.

6. The additive composition of claim 1, wherein said water-dispersible polymer comprises said neutralized vinyl polymer.

7. The additive composition of claim 6, wherein said neutralized vinyl polymer comprises the residue of at least one monomer having a carboxylic acid end group and/or an anhydride end group.

8. The additive composition of claim 7, wherein said neutralized vinyl polymer further comprises the residue of styrene, methyl methacrylate, butyl acrylate, butyl methacrylate, isobutyl methacrylate, and/or 2-ethylhexyl acrylate.

9. The additive composition of claim 6, wherein prior to neutralization said neutralized vinyl polymer has a Tg in the range of from about 60 to about 130° C.

10. The additive composition of claim 6, wherein prior to neutralization said neutralized vinyl polymer has an acid number in the ramie of from about 100 to about 500 mg KOH/g.

11. The additive composition of claim 1, wherein said water-dispersible polymer comprises said sulfopolymer.

12. The additive composition of claim 11, wherein said sulfopolymer has a Tg of at least about 25° C.

13. The additive composition of claim 11, wherein said sulfopolymer comprises the residue of a sulfomonomer having at least one metal sulfonate moiety.

14. The additive composition of claim 13, wherein said sulfomonomer is 5-sodiosulfoisophathalic acid.

15. The additive composition of claim 11, wherein said sulfopolymer comprises a sulfopolyester, a sulfopolyamide, and/or a sulfopolyesteramide.

16. The additive composition of claim 3, wherein said amphiphilic component comprises a surfactant and/or an amphiphilic polyester.

17. The additive composition of claim 16, wherein said amphiphilic component comprises said surfactant.

18. The additive composition of claim 17, wherein said surfactant has a HLB in the range of from about 6 to about 16.

19. The additive composition of claim 16, wherein said amphiphilic component comprises said amphiphilic polyester.

20. The additive composition of claim 19, wherein said amphiphilic polyester is a liquid sulfopolyester having a Tg of less than about 20° C.

21. The additive composition of claim 20, wherein said liquid sulfopolyester comprises the residue of a sulfomonomer having at least one metal sulfonate moiety.

22. The additive composition of claim 1, wherein said additive composition is combined with a coating composition to form a modified coating composition having a wet edge time of at least about 1.5 minutes, a scrub resistance of at least about 500 cycles, a wet adhesion of at least about 3, and a water resistance of at least about 3.

23. The additive composition of claim 1, wherein said water-dispersible polymer comprises said neutralized vinyl polymer, wherein the neutralized vinyl polymer is the reaction product of a vinyl polymer with a base in an amount to reduce the acid number of the vinyl polymer by at least 40 percent.

24. The additive composition of claim 23, wherein the acid number is reduced by at least 60 percent.

25. The additive composition of claim 24, wherein the acid number is reduced by at least 80 percent.

26. The additive composition of claim 1, wherein said additive composition is combined with a coating composition to form a modified coating composition having a wet edge time of at least about 3 minutes, a scrub resistance of at least about 700 cycles, an open time of at least about 5 minutes, and a block resistance of at least about 6.

27. The additive composition of claim 1, wherein the water insoluble plasticizer is selected from the group consisting of tri(ethylene glycol) bis(n-octanoate), tetra(ethylene glycol) bis(2-ethylhexanoate), tetra(ethylene glycol) dihexanoate, di(propylene glycol) bis(2-ethylhexanoate), tri(propylene glycol) bis(2-ethylhexanoate), and tri(propylene glycol) dihexanoate.

28. The additive composition of claim 1, wherein said additive composition comprises between 30 and 65 weight percent of said cyclohexanedimethanol.

29. The additive composition of claim 1, wherein said cyclohexanedimethanol comprises 1,4-cyclohexanedimethanol.

30. An additive composition comprising:
a) from about 30 to about 70 weight percent of at least one water-dispersible polymer, based on the total weight of solids in said additive composition, wherein said water-dispersible polymer comprises a neutralized vinyl polymer or a sulfopolymer, and wherein said water-dispersible polymer has a Tg in the range of from about 20° C. to about 160° C.:
b) 20 to 70 weight percent of at least one water-insoluble plasticizer, based on the total weight of solids in said additive composition, wherein said water-insoluble plasticizer has a molecular weight of less than about 1,000 g/mole; and,
c) from about 15 to about 65 weight percent of at least one cyclohexanedimethanol, based on the total weight of solids in said additive composition,
wherein said additive composition is an aqueous dispersion and has a VOC content of less than about 20 weight percent based on the total weight of said additive composition.

31. The additive composition of claim 30, wherein the water-insoluble plasticizer is selected from the group consisting of tri(ethylene glycol) bis(2-ethylhexanoate), tri(ethylene glycol) bis(n-octanoate), tetra(ethylene glycol) bis(2-ethylhexanoate), tetra(ethylene glycol) dihexanoate, di(propylene glycol) bis(2-ethylhexanoate), tri(propylene glycol) bis(2-ethylhexanoate), tri(propylene glycol) dihexanoate, and combinations thereof.

32. The additive composition of claim 30, wherein said water-dispersible polyester comprises said neutralized vinyl polymer.

33. The additive composition of claim 30, wherein said additive composition comprises between 25 and 52 weight percent of said cyclohexanedimethanol.

34. The additive composition of claim 30, wherein said cyclohexanedimethanol comprises 1,4-cyclohexanedimethanol.

* * * * *